UNITED STATES PATENT OFFICE.

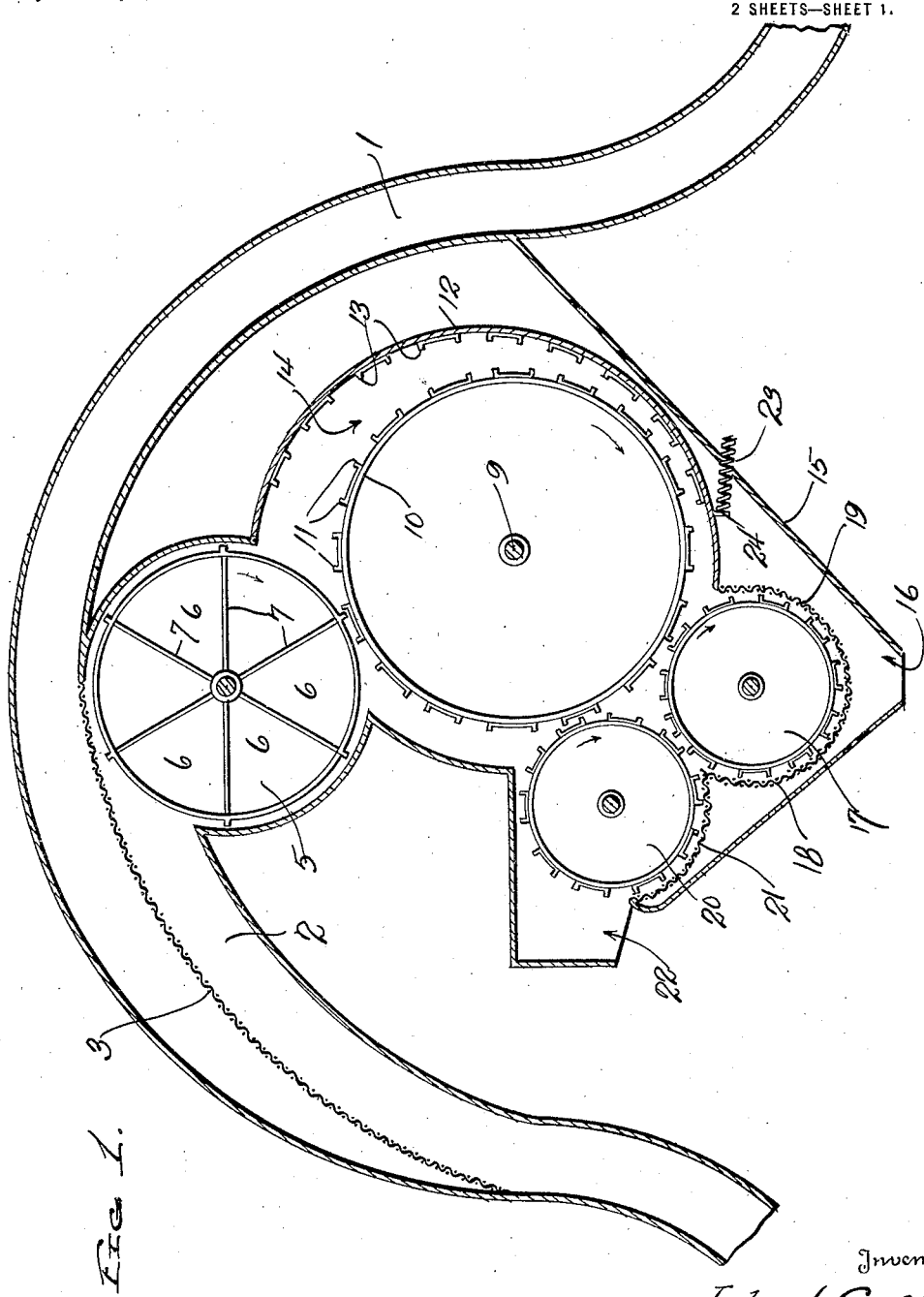

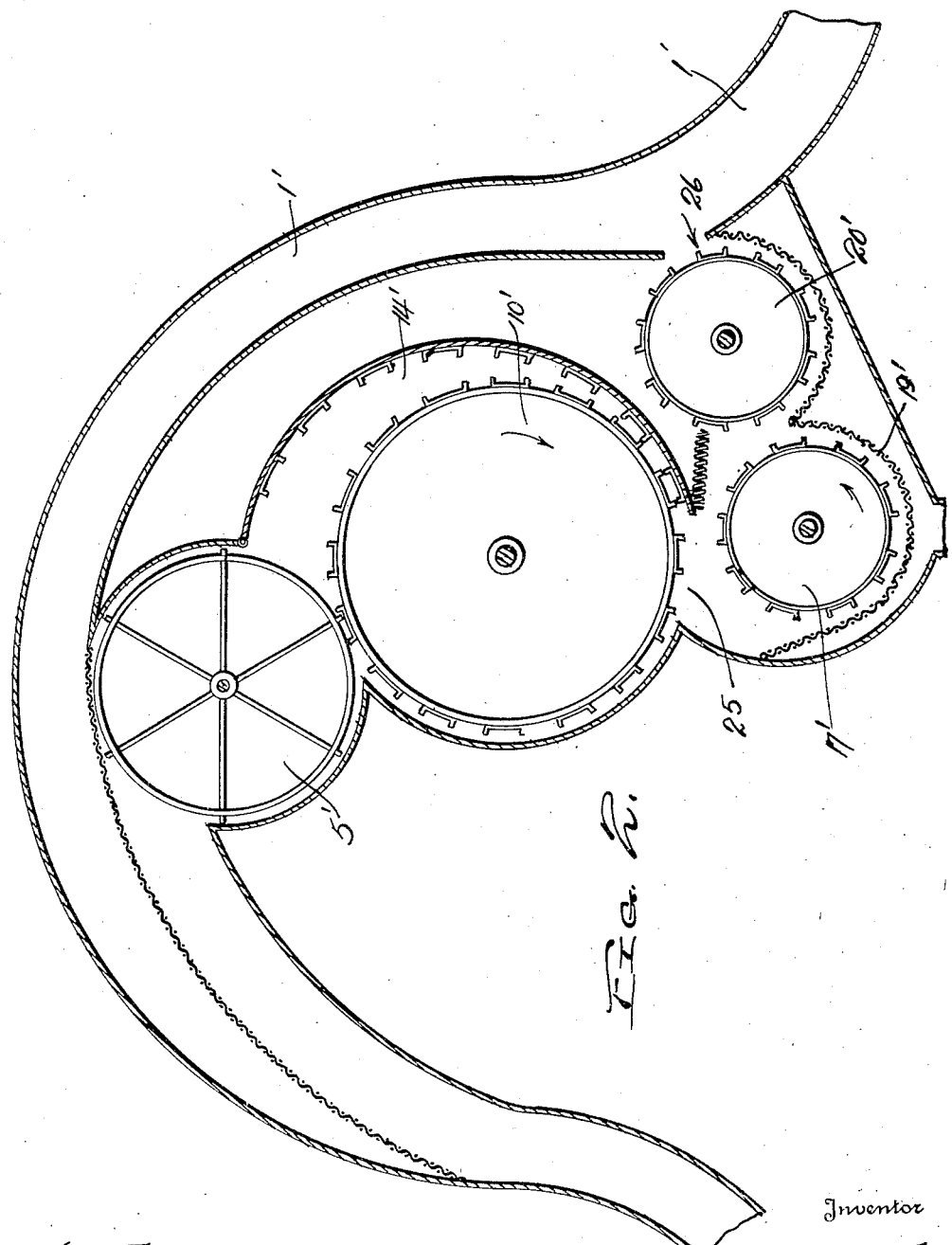

JOHN L. CASSEL, OF WINNSBORO, TEXAS.

COTTON-TREATING MACHINE.

1,332,425.　　　　Specification of Letters Patent.　　Patented Mar. 2, 1920.

Application filed September 19, 1919. Serial No. 324,948.

*To all whom it may concern:*

Be it known that I, JOHN L. CASSEL, a citizen of the United States, residing at Winnsboro, in the county of Wood and State of Texas, have invented certain new and useful Improvements in Cotton-Treating Machines, of which the following is a specification.

This invention relates to cotton treating machines and more particularly to an apparatus which is an improvement over the device described in my Patent #1,291,763 granted January 21, 1919.

One of the main objects of this invention is to provide a machine for treating and cleaning bolly cotton or any low grade cotton by means of a rolling process.

The invention further aims to provide a machine which will so separate the dirt and shale from the cotton as to provide a better grade of cotton by virtue of the fact that it is fluffed and thoroughly cleaned by the rolling process.

This invention is especially designed for treating bolly cotton or cotton which is gathered with burs which, when passing through the machine are rolled in such a manner as to open and loosen the burs from the cotton thereby making separation easy and sure during the process of ginning.

A still further important object of the invention is to provide a machine which will not beat or break the burs into small pieces, or tear the cotton while it is passing through the machine, but which will cause the cotton to be separated from the undesirable material in a manner that will improve the condition of the cotton so as to make the ginning operation easy, conserve the waste, and improve the grade of cotton dispensed by the machine.

The invention further aims to provide an apparatus which will treat or roll the immature or hard locks of cotton in such manner as to cause them to be fluffed so that they may be easily conserved during the ginning operation thereby further conserving waste and producing a greater per cent. of cotton.

The above and additional objects are accomplished by such means as are illustrated in the preferred embodiment and in the accompanying drawings, wherein like characters denote like or corresponding parts throughout the several views, in which:—

Figure 1 is a longitudinal section through the apparatus constructed in accordance with my invention, and Fig. 2 is a similar view showing a modified form of the mechanism.

Referring particularly to Fig. 1 wherein is illustrated one form of the invention in which the main passage-way 1 is curved through a relatively long arc and is provided with a relatively wide portion 2 through which extends a foraminous partition 3. The body of the machine is arranged to provide a vacuum roller compartment 4 within which is mounted a roller 5, preferably termed a vacuum roller which is provided on its interior with a series of pockets 6 formed by the dividing partitions 7. This roller is mounted upon a shaft 8 so that it may be freely rotated. The main shaft 9, may be driven in any preferred manner and carries a relatively large roller 10 which forms the main roller for the apparatus and which is provided on its periphery with a plurality of projecting members 11 which form agitating teeth. The recess for the roller 11 is somewhat larger than the diameter of the roller as shown in the drawings and the concaved wall 12 thus provided is provided on its inner surface with the teeth 13 and it will be noted that the relative curvatures of the roller 10 and the concaved wall 12 are such as to provide a tapered curved passage-way 14 through which the material passes during operation of the machine.

A hopper 15 extends below the rollers which has its open end 16 restricted in size and disposed near the bottom of the machine below the rollers. A relatively small roller 17 is disposed below the main roller 10 and preferably at one side of the vertical center of the main roller as shown in the drawings and has its periphery provided with the teeth 18. A foraminous wall or screen 19 embraces the roller 17 but is sufficiently spaced from the teeth 18 to provide a relatively narrow space through which the teeth travel when the roller is in operation. This roller is intended to rotate in the same direction as the main roller 10 as shown by the arrows. A second or complementary small roller 20 is disposed in an elevated position with respect to the corresponding roller 17 and this roller is also provided with teeth and the same travel in close proximity to a curved screen wall 21 which is formed by a continuation of the screen wall 19. This roller is also disposed near an outlet opening 22 which is disposed to permit the material to be ejected from the machine when in operation. It will be noted that the lower end of the curved wall 12 is connected to one end of the screen wall 19 and the curved wall is preferably flexible, that is, it is not fixed in any permanent position but may be flexed away from the surface of the main roller 10 if desired. To this end I have provided a coil spring 23 which is connected as indicated at 24 to the curved walls 12 and this spring tends to pull the curved wall outwardly when the material passing through the passage-way 14 tends to be congested.

In operation, the cotton will be taken up in the usual manner the vacuum roller will be in operation as all of the rollers are driven when the machine is operated. The cotton will thereby be drawn into the machine toward the main roller 10 and the latter will be rotating in the direction indicated by the arrow so that the material will be drawn into the restricted passage-way 14 whereby the teeth 11 and 13 will engage the cotton and brush for separating, and the continued movement of the rollers draws the material into engagement with the auxiliary roller 17 which, by virtue of its rotation in the same direction as the main roller causes the material to be drawn through the restricted space between the roller and the screen wall 19 dragging the material across the screen wall and further reducing the clustered parts. The small particles will pass through the screen and be ejected through the opening in the hopper 15. The second small roller or the supplementary roller 20 will then engage the material and move it over the screen wall 21 which action will conclude the treating of the material so that it will be ejected through the opening 22 where it will be received in any suitable receptacle for subsequent treatment in the gin or separator.

In Fig. 2 I have illustrated a modification of the structure shown in Fig. 1 and the arrangement is similar except that the rollers are arranged in different relations with respect to each other. In this form of the invention, however, the cotton passing from the restricted passage-way 14', is forced by the main roller 10' through a connecting opening 25 and the material is then received on the supplementary smaller roller 17' which however, turns in a reverse direction with respect to the main roller 10'. This roller also operates in close proximity to a screen wall 19' and carries the material upwardly to the complementary roller 20' which is arranged in proximity to an outlet opening 26 whereby the material is ejected into the passage-way 1 as distinguished from the above described form which causes the material to pass into the passage-way 22. The vacuum roller 5' and the main roller 10' are disposed in approximately the same positions as the form referred to in Fig. 1 but the two complementary rollers 17' and 20' are disposed substantially reversely to the positions shown in Fig. 1 so that the material is carried in a different direction wherein the vacuum system of ejection may be employed.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A cotton treating machine comprising a roller supporting structure, including a feed opening, a vacuum roller disposed in a recess in communication with said feed opening, a main roller having its periphery movable in close proximity to the periphery of said vacuum roller and provided with teeth on its curved surface, a compartment for said main roller including a pivoted curved wall having teeth on its inner surface and curved eccentrically to the curvature of the main roller whereby a restricted passage way is provided between the surface of the main roller and the inner surface of the curved wall of the main roller compartments and supplementary rollers adapted to receive the material from the said main rollers.

2. A cotton treating machine comprising a roller supporting structure including a feed opening, a vacuum roller disposed in a recess in communication with said feed opening, a main roller having its periphery movable in close proximity to the periphery of said vacuum roller and provided with teeth on its curved surface, a compartment for said main roller including a curved wall having teeth on its inner surface and curved eccentrically with respect to the curvature of the main roller so that the upper portion of said curved wall will be a greater distance from said main roller than the lower portion thereof, the upper portion of said curved wall pivoted to said roller supporting structure, said main roller adapted to rotate away from the upper pivoted portion of said curved wall, the teeth of said main roller and the lower portion of said curved wall being normally in close proximity to each other, means provided for pulling the lower portion of said curved wall away from said main roller so as to overcome the tendency of the main roller to pull the lower portion of the curved wall toward itself when the material is in engagement with the teeth of said main roller and said curved wall, and means provided to receive the material from said main roller.

In testimony whereof I affix my signature in presence of two witnesses.

JOHN L. CASSEL.

Witnesses:
  PAUL BELL,
  G. E. DARDENT.